United States Patent Office 3,361,746
Patented Jan. 2, 1968

3,361,746
2-CHLORO-s-TRIAZINES
Hans-Georg Schmelzer, Cologne-Buchforst, and Eberhart Degener, Leverkusen, Germany, assignors to Farbenfabriken Bayer Aktiengesellschaft, Leverkusen, Germany, a German corporation
No Drawing. Filed Nov. 29, 1963, Ser. No. 327,128
Claims priority, application Germany, Dec. 22, 1962, F 38,634
1 Claim. (Cl. 260—248)

Object of the present invention is a process for the production of 2-chloro-s-triazines. A further object is new 2-chloro-s-triazines which contain two different substituents.

It is already known to obtain 2-chloro-s-triazines by cotrimerization of cyanogen chloride with compounds containing nitrile groups. The trimerization reactions often lead to mixtures of substances which are difficult to work up and to separate.

A process has now been found for the production of 2-chloro-s-triazines of the general Formula III, in which compounds which have an amidine structure (I) are treated with 1,1,3,3-tetrachloro-2-aza-propenes of the general Formula IIa or the isomeric 1,1,3,3-tetrachloro-2-aza-propenes of the general Formula IIb which differ only in the position of the double bond and probably represent the same compound.

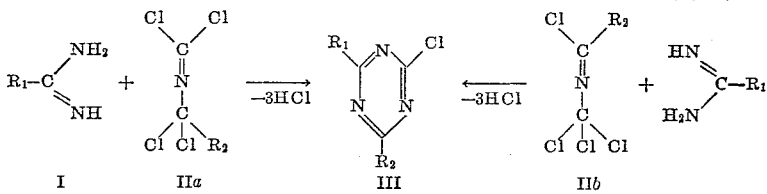

I        IIa        III        IIb

In the formula $R_1$ represents an alkyl-, aryl-, cycloalkyl-, aralkyl-, or a hydrocarbon-radical containing one or more olefinic double bonds or triple bonds, or a heterocyclic radical, or hydrogen, $-OR_3$, $-SR_3$, $-NH_2$, $-NHR_3$, $-NR_3R_4$, $-NH-N=CHR_3$, $-NH-C\equiv N$ or $$-N=CHR_3$$

$R_3$ and $R_4$ represent alkyl-, aryl-, cycloalkyl-, aralkyl-, hydrocarbon-radicals containing one or more olefinic double bonds or triple bonds or heterocyclic radicals. The radicals $R_3$, $R_4$ and the alkyl-, aryl-, cycloalkyl-, aralkyl-, heterocyclic and unsaturated hydrocarbon-radicals contained in $R_1$ may be substituted by one or more substituents. The substituents may be the radicals mentioned under $R_3$ or the halogens, the nitro-, ester-, carbonamide-, sulphonamide-, hydroxyl-, nitrile-, ether- and thioether-groups and, with the meaning for $R_3$ as given above, azo groups of the form $-N=N-R_3$, urea groups of the form

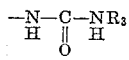

urethan groups of the form

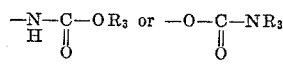

and amino groups which have been substituted twice by radicals mentioned under $R_3$. $R_2$ stands for chlorine, aryl-, alkyl-, cycloalkyl- and aralkyl-radicals which may be substituted once or several times by chlorine or by the trifluoromethyl radical and the radical $-CCl_2-N=CCl_2$.

The process claimed in the invention proceeds surprisingly smoothly even at low temperatures and generally yields 2-chloro-s-triazines in good yields and in some cases immediately in a high degree of purity. Most readily produced by this process are 2-chloro-s-triazines which are substituted by different radicals in the 4- and 6-position. These compounds have the formula

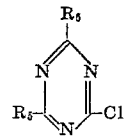

wherein $R_5$ represents an alkyl, an alkenyl, an alkinyl, a cycloalkyl, a cycloalkenyl, an aryl and an aralkyl radical all of which may be substituted e.g. by the halogen, nitro-, hydroxyl-, nitrile-, ether- and thioether-radicals and $R_6$ has the same meaning as $R_2$.

It is surprising that of the four available chlorine atoms of tetrachloro-2-aza-propenes, only three are split off in the reaction. Many of the reactions according to the invention take place particularly satisfactorily in aqueous solution or suspension and even in the presence of aqueous alkali. This fact is all the more surprising when one considers that tetrachloro-2-aza-propenes are very sensitive to hydrolysis without a suitable reaction partner.

Examples of compounds having an amidine structure (I) are: Benzamidine, 2-, 3- and 4-chlorobenzamidine, o-, m- and p-toluic acid amidine, 2-, 3- and 4-methoxybenzamidine, 2-, 3- and 4-nitrobenzamidine, phenyl acetamidine, acetamidine, trichloroacetamidine, proprionamidine, β-hydroxypropionamidine, β-chloropropionamidine, formamidine, isobutyric acid amidine, stearic acid amidine, linolic acid amidine, linolenic acid amidine, phenylpropiolic acid amidine, 2-, 3- and 4-pyridinicarbamidine, 1- and 2-naphthamidine, 4-cyclohexenyl-carbamidine, cyclohexane-carbamidine, cyclopentane-carbamidine, also the mineral acid salts or carboxylic acid salts of the said amidines, for example their hydrochlorides or acetates, guanidine, phenylguanidine, 4-chlorophenylguanidine, benzaliminoguanidine, dicyandiamide, also the mineral acid salts or carboxylic acid salts of the said guanidines, for example their hydrochlorides, carbonates or acetates, 2-methylpseudourea, 2-methylpseudothiourea, 2-benzylpseudothiourea, also the last two mentioned compounds as isothiuronium salts of mineral acids or carboxylic acids, e.g. the chlorides, sulphates and acetates. Suitable tetrachloro-2-aza-propenes prepared by the methods known in the literature (Angew. Chem. 74, 848 (1962)), are e.g. trichloromethyl-isocyanide-dichloride, pentachloroethyl-isocyanide-dichloride and the compound of Formula IV

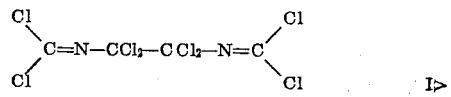

The following are examples of aryl substituted tetrachloro-2-aza-propenes:
3-phenyl-1,1,3,3-tetrachloro-2-aza-propene,
3-(4'-chlorophenyl)-1,1,3,3-tetrachloro-2-aza-propene,
3-(3',4'-dichlorophenyl)-1,1,3,3-tetrachloro-2-aza-propene,
3-(2'-chlorophenyl)-1,1,3,3-tetrachloro-2-aza-propene,
3-(3'-chlorophenyl)-1,1,3,3-tetrachloro-2-aza-propene,
3-(2'-6'-dichlorophenyl)-1,1,3,3-tetrachloro-2-aza-propene,
3-(3'-trifluoromethylphenyl)-1,1,3,3-tetrachloro-2-aza-propene and
1-phenyl-1,3,3,3-tetrachloro-2-aza-propene.

According to a separate proposal, these compounds are prepared by chlorinating arylmethyl-isothiocyanates or by chlorinating N-methyl-arylthionamides e.g. N-methylthiobenzamide.

According to the invention, the reaction is carried out by adding a tetrachloro-2-aza-propene, if desired in solution in an inert solvent, to a solution or suspension of the amidines or their salts and, if desired, a base at temperatures of −20 to +200° C., preferably 0 to 100° C., if necessary with external cooling. The reactions are generally exothermic. In some cases, it is advisable to heat the reaction mixture for some time after all the components have been added. Sometimes it is advisable to add the reaction components in the reversed sequence.

Sutiable inert solvent for tetrachloro-2-aza-propenes are, for example, ethers such as diethylether, dioxane and tetrahydrofurane, ketones such as acetone and methyl ethyl ketone, aliphatic hydrocarbons and their mixtures such as cyclohexane, and petroleum ether fractions, chlorinated aliphatic hydrocarbons such as methylene chloride, chloroform, carbon tetrachloride, tri- and perchloroethylene and aromatic hydrocarbons such as benezene and toluene. Suitable solvents for the amidines and their salts are water, alcohols such as methanol, ethanol, isopropanol and glycol monoethylether, esters such as acetic ester and glycol monomethylether acetate, also the above mentioned solvents for tetrachloro-2-aza-propenes as well as dimethylformamide, dimethylsulphoxide, dimethylsulphone, and solvent mixtures of the said solvents such as acetone/water, methanol/water and diphasic systems such as ether/water, benzene/water and methylene chloride/water.

To neutralize the acids formed in the reaction, the calculated quantity of a base is preferably added. Suitable bases are, for example, sodium hydroxide, potassium hydroxide, aqueous ammonia solution, ammonia gas, sodium carbonate, potassium carbonate, sodium acetate, tertiary amines such as pyridine, triethylamine, N,N-dimethyl-cyclohexylamine, N,N-dimethylaniline, sodium- and potassium - methoxide and potassium-tertiary-butoxide. When free amidine bases are used, the base may be replaced by an excess of amidine.

Depending on the solvent used for the reaction, the 2-chloro-s-triazines are obtained in crystalline form during the reaction or they may be obtained after the reaction by precipitation with water or by concentrating the solvent by evaporation.

The 2-chloro-s-triazines obtained by the process according to the invention are valuable intermediate products, for example for the production of pharmaceuticals.

They may further be used for the production of optical brightening agents which are obtained by reacting 2-chloro-s-triazines with 4,4′-diamino-stilbene-disulfo-acid-(2,2′) according to known methods. These brightening agents correspond to the formula

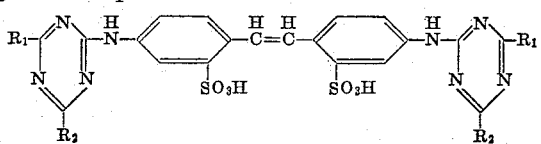

They are excellently suited for th ebrightening of fibers.

*Example 1*

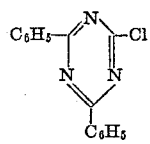

A solution of 13 parts by weight of 3-phenyl-1,1,3,3-tetrachloro-2-aza-propene in 30 parts by weight of acetone is addded dropwise to a suspension of 8 parts by weight of benzamidine hydrochloride and 14 parts by weight of potassium carbonate in 50 parts by weight of acetone at 20 to 25° C. with stirring and external cooling. The mixture is heated under reflux for 4 hours and 100 parts by weight of water are then added. A pale yellow, semi-crystalline mass separates which is completely crystallized after some stirring and is then removed by suction filtration; the yield is practically quantitative. After recrystallizing from glycol monomethyl-ether, the colorless crystals melt at 138 to 139° C. The mixed melting point with authentic material gives no depression. The experiment produces the same result when a solution of 8 parts by weight of benzamidine hydrochloride and 14 parts by weight of potassium carbonate in 50 parts by weight of water are used instead of a suspension in 50 parts by weight of acetone. When 13 parts by weight of 3-phenyl-1,1,3,3-tetrachloro-2-aza-propene in 20 parts by weight of acetone have been added, the mixture is stirred for another 4 hours and worked up as above.

*Example 2*

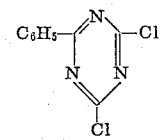

10.8 parts by weight of trichloromethyl-isocyanide-dichloride are added dropwise to a suspension of 8 parts by weight of benzamidine hydrochloride and 14 parts by weight of potassium carbonate in 50 parts by weight of acetone at room temperature with stirring and external cooling. The reaction mixture is thereafter stirred for 4 hours. 100 parts by weight of water are then added, whereupon a pale yellow crystalline product separates. The crystals are sucked off, washed with water and a small quantity of methanol and dried; yield 4.6 parts by weight. After recrystallizing from ethanol, the colorless crystals melt at 118 to 119° C. (Lit. 119–120° C.) Comparing the IR-spectrum with that of the authentic material proves the identity of the compounds.

*Example 3*

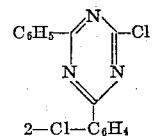

1.91 parts by weight of 2-chlorobenzamidine-hydrochloride are dissolved in 20 parts by weight of water and treated with a solution of 0.8 part by weight of sodium hydroxide in 20 parts by weight of water. 2.6 parts by weight of 3-phenyl-1,1,3,3-tetrachloro-2-aza-propene in 10 parts by weight of acetone are added dropwise at 20 to 25° C. with stirring and external cooling. A crystalline product separates which is sucked off, washed with water and dried. The yield is practically quantitative. After recrystallizing from glycol monomethyl-ether acetate, the colorless crystals melt at 115 to 116° C.

Calculated [$C_{15}H_9Cl_2N_3$ (302)]: C, 59.60; H, 2.98; Cl, 23.51; N, 13.90. Found: C, 59.63; H, 3.22; Cl, 23.20; N, 13.67.

*Example 4*

A solution of 6 parts by weight of sodium hydroxide in 30 parts by weight of water is added to a solution of 6 parts by weight of benzamidine hydrochloride in 30 parts by weight of water. 9.3 parts by weight of a mixture of the isomers 3-phenyl-1,1,3,3-tetrachloro - 2 - aza-propene and 1-phenyl-1,3,3,3-tetrachloro-2-aza-propene in 10 parts by weight of acetone are then added dropwise with stirring and external cooling at 20 to 25° C. A crystalline product is obtained which is sucked off, washed with water and dried. Yield 9.3 g. or 96% of the theoretical calculated on the quantity of isomer mixture used.

After recrystallizing from glycol monomethyl-ether, the colorless crystals melt at 138 to 139° C. The compound is identical to that obtained according to Example 1.

To prepare the isomer mixture of 3-phenyl-1,1,3,3-tetrachloro-2-aza-propene and 1-phenyl-1,3,3,3-tetrachloro-2-aza-propene used in the reaction, a solution of 30 parts by weight of N-methyl-thiobenzamide in 150 parts by weight of tetrachloroethane are introduced at room temperature until uptake of chlorine is complete. The sulphur which precipitates is removed by suction. The reaction solution is then further chlorinated while slowly raising the temperature to boiling, until no further weight increase takes place. By fractionation in vacuo, 22 parts by weight of the isomer mixture are obtained at 153 to 166° C./16 mm.

*Example 5*

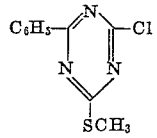

A solution of 25.7 parts by weight of 3-phenyl-1,1,3,3-tetrachloro-2-aza-propene in 40 parts by weight of acetone is added dropwise to a solution of 14.2 parts by weight of S-methylisothiuronium sulphate and of 12 parts by weight of sodium hydroxide in 60 parts by weight of water, with stirring and external cooling at 20 to 25° C. An orange red oil separates which crystallizes completely after stirring for some time. After recrystallization from methanol, 2-chloro-4-methylmercapto-6-phenyl-s-triazine separates out in colorless crystals of M.P. 90 to 91° C.

Calculated [C$_{10}$H$_8$ClN$_3$S (237.5)]: C, 50.51; H, 3.37; Cl, 14.95; N, 17.68; S, 13.48. Found: C, 50.60; H, 3.39; Cl, 14.85; N, 17.18; S, 13.70.

*Example 6*

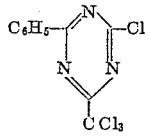

13 parts by weight of 3-phenyl-1,1,3,3-tetrachloro-2-aza-propene in 20 parts by weight of acetone are added dropwise to a solution of 8 parts by weight of trichloro-acetamidine and of 6 parts by weight of sodium hydroxide in 70 parts by weight of water, with stirring and external cooling at 20 to 25° C. A colorless crystalline product separates which is sucked off, washed with water and dried in vacuo; yield 13.1 parts by weight, 85% of the theoretical. After recrystallizing from ethanol, the colorless crystals melt at 125 to 126° C.

Calculated [C$_{10}$H$_5$Cl$_4$N$_3$ (309)]: C, 38.83; H, 1.62; Cl, 45.95; N, 13.60. Found: C, 38.95; H, 1.93; Cl, 45.40; N, 13.20.

*Example 7*

15 parts by weight of pentachloroethyl-isocyanide-dichloride in 10 parts by weight of acetone are added dropwise to a solution of 8 parts by weight of benzamidine-hydrochloride and 8 parts by weight of sodium hydroxide in 50 parts by weight of water, with stirring and external cooling to 20 to 25° C. An oily reaction product is first obtained which crystallizes completely after some time. After recrystallizing from methanol, the colorless crystals melt at 125 to 126° C. The compound is identical to 2-chloro - 4 - trichloromethyl-6-phenyl-s-triazine obtained according to Example 6.

*Example 8*

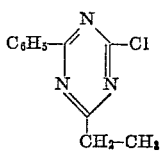

The solutions of 7.7 parts by weight of propionamidine-hydrobromide in 20 parts by weight of water and 12.9 parts by weight of 3 - phenyl-1,1,3,3-tetrachloro-2-aza-propene in 20 parts by weight of acetone are mixed. 8 parts by weight of sodium hydroxide in 20 parts by weight of water are added dropwise to this mixture with vigorous stirring and external cooling at 20 to 25° C. 2-chloro-4-ethyl-6-phenyl-s-triazine at first separates as an oil but crystallizes on cooling and is obtained in colorless crystals from a small quantity of methanol, M.P. 30 to 32° C.

Calculated [C$_{11}$H$_{10}$ClN$_3$ (219.5)]: C, 60.13; H, 4.56; Cl, 16.17; N, 19.13. Found: C, 59.50; H, 4.32; Cl, 16.15; N, 19.35.

*Example 9*

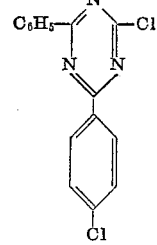

12.9 parts by weight of 3-phenyl-1,1,3,3-tetrachloro-2-aza-propene in 20 parts by weight of acetone are added dropwise to a solution of 9.6 parts by weight of 4-chloro-benzamidine-hydrochloride and 8 parts by weight of sodium hydroxide in 100 parts by weight of water, with stirring and external cooling at 20 to 25° C. The colorless crystalline reaction product is removed by suction filtration, washed with water and dried in vacuo. The yield is practically quantitative. After recrystallization from glycol monomethyl-ether acetate, 2 - chloro-4-(4'-chlorophenyl)-6-phenyl-s-triazine is obtained in colorless crystals, M.P. 151–152°C.

Calculated [C$_{15}$H$_9$Cl$_2$N$_3$ (302)]: C, 59.60; H, 2.98; Cl, 23.50; N, 13.91. Found: C, 59.47; H, 2.96; Cl, 23.05; N, 13.88.

*Example 10*

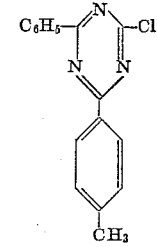

The process is carried out as in Example 9 but 8.5 parts by weight of 4-toluic acid amidine-hydrochloride are used instead of 9.6 parts by weight of 4-chlorobenzamidine-hydrochloride, and 2 - chloro-4-(4'-tolyl)-6-phenyl-s-triazine is obtained in practically quantitative yield in the form of colorless crystals which melt at 141° C. after recrystallization from glycol monomethyl-ether acetate.

Calculated [C$_{16}$H$_{12}$ClN$_3$ (281.5)]: C, 68.21; H, 4.26; Cl, 12.61; N, 14.92. Found: C, 68.47; H, 4.64; Cl, 12.70; N, 14.71.

*Example 11*

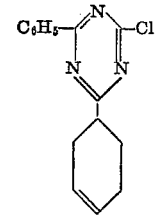

2-chloro-4-(3'-cyclohexenyl)-6-phenyl-s-triazine is obtained in practically quantitative yield from 8.1 parts by weight of 3-cyclohexene-carbamidine-hydrochloride by the process described in Examples 9 and 10. The product, which is at first oily, crystallizes completely on standing and can be recrystallized from methanol to colorless crystals, M.P. 54° C.

Calculated [$C_{15}H_{14}ClN_3$ (271.5)]: C, 66.30; H, 5.15; Cl, 13.08; N, 15.47. Found: C, 67.17; H, 5.45; Cl, 12.00; N, 14.89.

Example 12

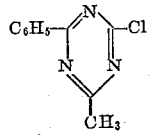

A solution of 12.9 parts by weight of 3-phenyl-1,1,3,3-tetrachloro-2-aza-propene is added dropwise to a solution of 4.8 parts by weight of acetamidine-hydrochloride and 8 parts by weight of sodium hydroxide in 50 parts by weight of water at 10 to 15° C. The crystalline precipitate is removed by suction filtration, washed with water and dried. After recrystallization from petroleum ether, 6.9 parts by weight of 67% of the theoretical yield of 2-chloro-4-methyl-6-phenyl-s-triazine are obtained in the form of colorless crystals, M.P. 75.5 to 76.5° C.

Calculated [$C_{10}H_8ClN_3$ (205.5)]: C, 58.40; H, 3.89; Cl, 17.26; N, 20.45. Found: C, 58.37; H, 4.07; Cl, 17.20; N, 19.95.

Example 13

A solution of 7.3 parts by weight of 3-(4'-chlorophenyl)-1,1,3,3-tetrachloro-2-aza-propene is added dropwise to a solution of 4 parts by weight of benzamidine-hydrochloride and 4 parts by weight of sodium hydroxide in 40 parts by weight of water. A practically quantitative yield of 2-chloro-4-(4'-chlorophenyl)-6-phenyl-s-triazine, M.P. 151–152° C., is obtained. The compound is identical to that obtained in Example 9.

Example 14

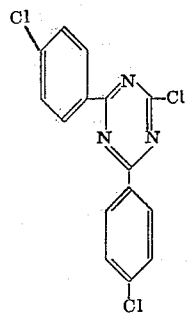

The process is carried out as in Example 13 but 4.8 parts by weight of 4-chlorobenzamidine-hydrochloride are used instead of benzamidine hydrochloride, and a practically quantitative yield of 2-chloro-2,4-di-(4'-chlorophenyl)-s-triazine, M.P. 212 to 213° C., is obtained (Lit. 213° C.).

Example 15

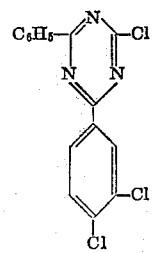

2-chloro-4-(3',4'-dichlorophenyl)-6 - phenyl-s-triazine, M.P. 152 to 152.5° C., is obtained in practically quantitative yield by reacting 4 parts by weight of benzamidine hydrochloride with 8.2 parts by weight of 3-(3',4'-dichlorophenyl)-1,1,3,3-tetrachloro-2-aza-propene.

Calculated [$C_{15}H_8Cl_3N_3$ (336.5)]: C, 53.49; H, 2.38; Cl, 31.65; N, 12.48. Found: C, 53.37; H, 2.55; Cl, 31.65; N, 12.45.

Example 16

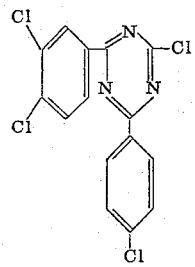

2-chloro-4-(4'-chlorophenyl)-6 - (3'',4''-dichlorophenyl)-s-triazine, M.P. 227.5 to 228.5° C., is obtained in good yield from 4.8 parts by weight of 4-chlorobenzamidine-hydrochloride and 8.2 parts by weight of 3-(3',4'-dichlorophenyl)-1,1,3,3-tetrachloro-2-aza-propene.

Calculated [$C_{15}H_7Cl_4N_3$ (371)]: C, 48.52; H, 1.89; Cl, 38.28; N, 11.32. Found: C, 48.59; H, 2.11; Cl, 37.90; N, 11.19.

Example 17

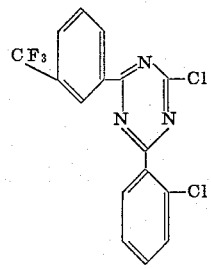

23 parts by weight or 62% of the theoretical amount of 2-chloro-4-(2'-chlorophenyl) - 6 - (3''-trifluoromethylphenyl)-s-triazine M.P. 94–95° C., are obtained from 19.1 parts by weight of 2-chlorobenzamidine-hydrochloride and 32.5 parts by weight of 3-(3'-trifluoromethylphenyl)-1,1,3,3-tetrachloro-2-aza-propene.

Calculated [$C_{16}H_8Cl_2N_3$ (370)]: C, 51.89; H, 2.16; Cl, 19.19; N, 11.35. Found: C, 52.24; H, 2.22; Cl, 18.05; N, 11.56.

Example 18

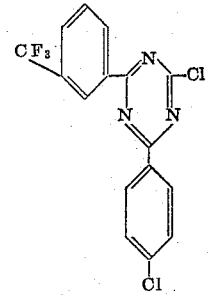

33.5 parts by weight or 91% of the theoretical amount of 2 - chloro - 4-(4'-chlorophenyl)-6-(3'''-trifluoromethylphenyl)-s-triazine, M.P. 139–139.5° C., are obtained by reacting 19.1 parts by weight of 4-chlorobenzamidine-hydrochloride with 32.5 parts by weight of 3-(3'-trifluoromethyl-phenyl)-1,1,3,3-tetrachloro-2-aza-propene.

Calculated [$C_{16}H_8Cl_2F_3N_3$ (370)]: C, 51.89; H, 2.16; Cl, 19.19; N, 11.35. Found: C, 51.97; H, 2.42; Cl, 19.05; N, 11.45.

Example 19

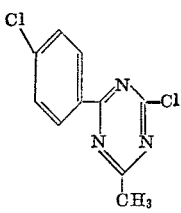

34 parts by weight or 95% of the theoretical amount of 2 - chloro - 4-methyl-6-(4'-chlorophenyl)-s-triazine, M.P. 140–141° C., are obtained by reacting 14.2 parts by weight of acetamidine-hydrochloride and 44 parts by weight of 3-(4'-chlorophenyl)-1,1,3,3-tetrachloro-2-aza-propene.

Calculated [$C_{10}H_7Cl_2N_3$ (240)]: C, 50.00; H, 2.92; Cl, 29.58; N, 17.50. Found: C, 49.96; H, 3.02; Cl, 29.55; N, 17.43.

Example 20

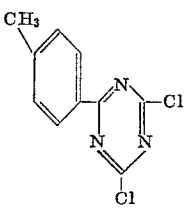

A solution of 10.8 parts by weight of trichloromethyl-isocyanide-dichloride in 20 parts by weight of acetone is added dropwise to a solution of 9.6 parts by weight of 4-chlorobenzamidine-hydrochloride and 8 parts by weight of sodium hydroxide in 100 parts by weight of water, with external cooling at 20 to 25° C. The pale yellow crystalline precipitate is removed by suction filtration, washed with water and dried in vacuo over calcium chloride. The yield of 2,4-dichloro-6-(4'-chlorophenyl)-s-triazine, which is obtained in colorless crystals, M.P. 148° C., after recrystallization from glycol monomethyl-ether acetate is practically quantitative.

Calculated [$C_9H_4Cl_3N_3$ (260.5)]: C, 41.45; H, 1.54; N, 16.12. Found: C, 42.06; H, 1.73; N, 16.16.

Example 21

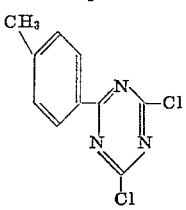

When 8.6 parts by weight of 4-toluic acid amidine-hydrochloride are used instead of 4-chlorobenzamidine-hydrochloride and the process is otherwise carried out as in Example 20, a practically quantitative yield of 2,4-dichloro-6-(4'-tolyl)-s-triazine, M.P. 144° C. (from methyl cyclohexane), is obtained.

Calculated [$C_{10}H_7Cl_2N_3$ (240)]: C, 50.00; H, 2.92; N, 17.50. Found: C, 50.92; H, 3.10; N, 17.48.

Example 22

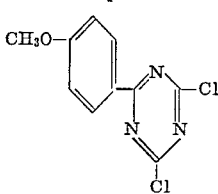

8.8 parts by weight or 69% of the theoretical amount of 2,4 - dichloro - 6-(4'-methoxy-phenyl)-s-triazine, M.P. 137–138° C., are obtained from 9.3 parts by weight of 4-methoxybenzamidine-hydrochloride by the process described in Examples 20 and 21.

Calculated [$C_{10}H_7Cl_2N_3O$ (256)]: C, 46.88; H, 2.74; Cl, 27.73; N, 16.41; O, 6.25. Found: C, 47.05; H, 2.93; Cl, 27.70; N, 16.14; O, 6.63.

Example 23

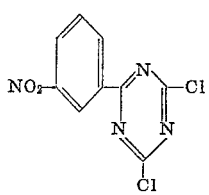

100 parts by weight of acetone and 100 parts by weight of ice are added to a solution of 20 parts by weight of 3-nitrobenzamidine-hydrochloride in 40 parts by weight of water. A solution of 21.6 parts by weight of trichloromethyl-isocyanide-dichloride is then added. 16 parts by weight of sodium hydroxide in 40 parts by weight of water are then added dropwise at 0 to 10° C. with external cooling. The crystalline precipitate is filtered off by suction, washed with water and recrystallized from methyl cyclohexane after drying in vacuo. 17 parts by weight or 63% of the theoretical amount of 2,4-dichloro-6-(3'-nitrophenyl)-s-triazine are obtained in the form of colorless crystals, M.P. 149 to 150° C.

Calculated [$C_9H_4Cl_2N_4O_2$ (271)]: C, 39.85; H, 1.48; Cl, 26.20; N, 20.66; O, 11.81. Found: C, 40.29; H, 1.62; Cl, 26.10; N, 20.75; O, 11.91.

Example 24

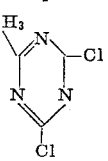

A solution of 108 parts by weight of trichloromethyl-isocyanide-dichloride in 600 parts by weight of methylene chloride is added to a solution of 48 parts by weight of acetamidine-hydrochloride in 150 parts by weight of water. The mixture is cooled to −8 to −6° C., and 80 parts by weight of sodium hydroxide in 200 parts by weight of water are added dropwise at this temperature with vigorous stirring. After all the sodium hydroxide has been added, the mixture is stirred for another 15 minutes and then filtered using suction, the methylene chloride layer is separated from the filtrate, dried over sodium sulphate and concentrated by evaporation. 68 parts by weight or 83% of the theoretical amount of 2,4-dichloro-6-methyl-s-triazine remain behind. After recrystallizing from a petroleum ether, the melting point rises from 96–98° C. to 98–99° C. (Lit. 98° C.). The compound is identical to 2,4-dichloro-6-methyl-s-triazine which has hitherto been obtained in lower yield by what was then the best method, consisting of reacting cyanuric chloride with methyl magnesium-bromide or -iodide.

Example 25

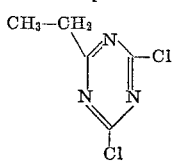

30.6 parts by weight of propionamidine-hydrobromide are suspended in a solution of 43.1 parts by weight of trichloromethyl-isocyanide-dichloride in 250 parts by weight of methylene chloride, and 32 parts by weight of sodium hydroxide in 60 parts by weight of water are added dropwise at −8 to −6° C. with vigorous stirring. The product is worked up by the process described in Example 24. After removal of methylene chloride, a yellow oil remains behind which is distilled. At 89–91° C./14 mm. (Lit. 92°/13 mm.) 21.5 parts by weight or 60% of the theoretical amount of 2,4-dichloro-6-ethyl-s-triazine distil over as a colorless oil which solidifies to crystals of M.P. 34–35° C. (Lit. 35° C.).

*Example 26*

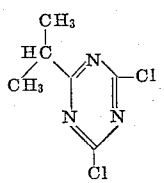

2,4-dichloro-6-isopropyl-s-triazine is obtained in good yield as a colorless oil of B.P. 85–87° C./12 mm. (Lit. 101–104°/12 mm.) from isobutyric acid-amidine-hydrochloride by the process described in Examples 24 and 25.

*Example 27*

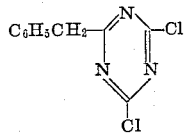

2,4-dichloro-6-benzyl-s-triazine is obtained in good yield in the form of colorless crystals of M.P. 86.5 to 87.5° C. (Lit. 86–87° C.) from phenyl-acetamidine-hydrochloride.

*Example 28*

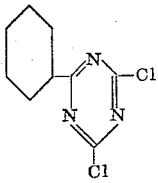

2,4-dichloro-6-cyclohexyl-s-triazine, M.P. 50–51° C. (Lit. 49–50° C.) is obtained from cyclohexane-carbamidine-hydrochloride by the process described in Examples 24–27.

*Example 29*

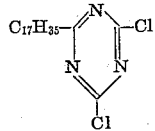

Solutions of 14 parts by weight of stearic acid amidine in 100 parts by weight of methylene chloride and of 10.8 parts by weight of trichloromethyl-isocyanide-dichloride in 150 parts by weight of methylene chloride are mixed at −10 to −5° C. A solution of 6 parts by weight of sodium hydroxide in 50 parts by weight of water is added dropwise with vigorous stirring at 0 to 10° C. to the suspension which is being formed. The methylene chloride layer is separated and concentrated by evaporation. A yellow brown oil remains behind. By distillation in vacuo at about 240 to 250° C./1 mm., 12 parts by weight or 62% of the theoretical amount of 2,4-dichloro-6-heptadecyl-s-triazine are obtained as a colorless oil which solidifies to crystals of M.P. 32–33.5° C.

Calculated [$C_{20}H_{35}Cl_2N_3$ (388)]: C, 61.86; H, 9.02; Cl, 18.30; N, 10.82. Found: C, 61.08; H, 8.89; Cl, 18.65; N, 11.10.

*Example 30*

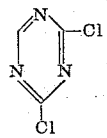

A solution of 16 parts by weight of sodium hydroxide in 30 parts by weight of water is added dropwise with vigorous stirring at −10 to −5° C. to a suspension of 10 parts by weight of formamidine-hydrochloride in a solution of 21.6 parts by weight of trichloromethyl-isocyanide-dichloride in 150 parts by weight of methylene chloride. On concentrating the methylene chloride layer by evaporation, an orange yellow oil remains behind which distils over at 70°/20 mm. and solidifies in the receiver to colorless crystals of M.P. 49–50° C. (Lit. 50–52° C.). When reacted with aniline, 2,4-dichloro-s-triazine forms 2,4-dianilino-s-triazine of M.P. 315° C. (Lit. 316° C.).

We claim:
1. 2-chloro-4-(2′-chlorophenyl)-6-(3′-trifluoromethylphenyl)-s-triazine.

References Cited
UNITED STATES PATENTS

| | | | |
|---|---|---|---|
| 2,845,421 | 7/1958 | Grundmann et al. | 260—248 |
| 2,951,079 | 8/1960 | Schroeder et al. | 260—248 |
| 3,277,091 | 10/1966 | Schmelzer et al. | 260—248 |
| 1,911,689 | 5/1933 | Hentrich et al. | 260—248 |

OTHER REFERENCES

Smolin et al.: "s-Triazines and Derivatives," Interscience Pub., Inc., New York (1959), pp. 187–8.

Ostrogovich: Chemiker Zeitung, vol. 36, pp. 738–9 (1912).

WALTER A. MODANCE, *Primary Examiner.*

JOHN M. FORD, *Assistant Examiner.*